US012208535B2

(12) United States Patent
Jaget et al.

(10) Patent No.: US 12,208,535 B2
(45) Date of Patent: Jan. 28, 2025

(54) MINI POTTERY WHEEL

(71) Applicant: Make It Real LLC, Pikesville, MD (US)

(72) Inventors: Jonathan Jaget, Hong Kong (CN); Marie-Michele Girard-Rheault, Magog (CA); Dominique Roy, Montreal (CA)

(73) Assignee: Make It Real LLC, Pikesville, MD (US)

( * ) Notice: Subject to any disclaimer, the term of this patent is extended or adjusted under 35 U.S.C. 154(b) by 0 days.

(21) Appl. No.: 18/064,706

(22) Filed: Dec. 12, 2022

(65) Prior Publication Data

US 2024/0190041 A1 Jun. 13, 2024

(51) Int. Cl.
*B28B 1/02* (2006.01)

(52) U.S. Cl.
CPC .................................... *B28B 1/025* (2013.01)

(58) Field of Classification Search
CPC B28B 1/025; B28B 1/02; B28B 17/00; B28B 1/08; Y10S 425/12; Y10S 425/033
USPC .......................................................... 425/459
See application file for complete search history.

(56) References Cited

U.S. PATENT DOCUMENTS 3,894,830 A * 7/1975 Edwards .................. B28B 1/02 425/459
4,028,041 A * 6/1977 Zambrano, Jr. ......... B28B 1/025 425/459
4,102,622 A * 7/1978 Simpson ................. B29C 41/02 425/459
4,585,240 A * 4/1986 Giffin ...................... B28B 1/025 279/151
8,308,483 B2 * 11/2012 Hume .................... G09B 11/00 434/81
9,815,221 B1 * 11/2017 Warnock ............. B28B 11/0809
2004/0142061 A1 * 7/2004 Oakes ..................... B28B 1/025 425/459
2008/0290540 A1 * 11/2008 Griffin .................... B28B 1/025 425/266

(Continued)

FOREIGN PATENT DOCUMENTS

CN 2593994 Y 12/2003
CN 213260105 U 5/2021
JP 3914255 B1 * 5/2007 ............ B28B 1/025

(Continued)

OTHER PUBLICATIONS

Machine English translation of Yamada (JP-3914255-B1); (2017) (Year: 2017).*

(Continued)

*Primary Examiner* — Jeffrey M Wollschlager
*Assistant Examiner* — Edgaredmanuel Troche
(74) *Attorney, Agent, or Firm* — Harness, Dickey & Pierce, P.L.C.

(57) ABSTRACT

The present invention relates to a mini pottery wheel for shaping clay or other suitable materials to a desired shape. The clay is maintained upon a rotatable platform during shaping by a post member which is cooperatively engaged by the clay or other suitable material by a centering tool assembly to ensure that the material remains centrally positioned upon the rotatable platform. As will be appreciated, the present invention offers a fun and convenient way for users to form a variety of end products.

20 Claims, 7 Drawing Sheets

(56) References Cited

U.S. PATENT DOCUMENTS

2011/0236515 A1* 9/2011 Kuriki .................... B28B 1/025
425/86

FOREIGN PATENT DOCUMENTS

KR 10-2007-0103175 A 10/2007
KR 100933497 B1 12/2009

OTHER PUBLICATIONS

NPL "Mini Pottery Studio" from "Weekly roundup: Mom's Choice Awards Honorees—Dec. 17, 2023-Dec. 23, 2023"; Retrieved from https://www.momschoiceawards.com/blog/wr-2023-12-17-2023-12-23/ (Year: 2023).*
Artskills, "Pottery Wheel instructional video", youtube, Aug. 11, 2018(URL:https://www.youtube.coin/watch?v=Rv6sL_nMORO) 0:18-1:40.
International Search Report and Written Opinion of the ISA issued in PCT/US2023/083378, mailed Apr. 24, 2024; ISA/US.

* cited by examiner

MINI POTTERY WHEEL

BACKGROUND

Arts and crafts have been an integral part of culture across a broad cross-section of society for both children and adults from various cultural and ethnic backgrounds for tens of thousands of years. One specific art and craft field is that of pottery, which archeologists estimate has been carried out for thousands of years. For example, the first pottery wheels are estimated to have been placed in use as early as five thousand years ago.

Over the millennia, improvements have been made to the use of pottery wheels to enhance performance and expand the pottery products achieved.

However, the size of known pottery wheels tends to be fairly large and quite heavy which, of course, means that dedicated space for use is required, especially where cleanup is factored in. The size of the known pottery wheels can also make it difficult for children to enjoy the experience of expressing their creativity by forming products.

Another common issue has been maintaining the raw clay to be worked about the center of the pottery wheel. Off center clays result in unacceptable end product, if any. Still another downside as to the use of existing pottery wheels is the relative mess involved. This problem persists using pottery wheels operable at various speeds. The mess adds substantial time during use and involves a lot of time to clean everything up to prepare for additional use.

In view of the foregoing, the present invention addresses each of the above noted issues relating to currently known pottery wheels. Still, other advantages will become apparent upon review of the summary, detailed description and claims when taken in conjunction with various figures provided.

SUMMARY

It is the object of the present invention to provide a mini pottery wheel which is easy to set up and use with minimal clean up after use. By "mini", it is meant that the device can be used in most settings including, without limitation, most table-tops or countertops. The mini pottery wheel generally includes a centering tool assembly to set up and position the clay during use, a base structure including a motor for driving the rotatable clay platform wheel, and an alignment structure for ensuring that the clay to be shaped is maintained centrally upon the platform.

The centering tool assembly includes in its most basic form a removable shell into which clay is packed to ready it for use, and a post which remains in the clay while the clay is being shaped. The base includes a decorative body which hosts the motor and associated electronics, and a top plate for receiving the cover once the clay is readied for shaping. The alignment structure is generally in the form of an at least partially transparent cover which generally includes one or more slots for receiving a shaping tool during use. The cover also includes a pin extending downwardly in the direction of the clay. The pin seats within the centering tool post to ensure that the clay remains centrally located upon a rotatable platform while being worked. The mini pottery wheel described herein is easy to set up, easy to use, and easy to clean to ready it for additional use. Thus, not only can both children and adults enjoy the opportunity to express themselves creatively by using the present invention, but useful end products can be achieved with little to no experience working with clay. The device is particularly suited to making relatively small objects which gives the user an enhanced sense of control and fulfillment. Many other features and advantages will become apparent by referring to the below presented detailed description of the invention.

BRIEF DESCRIPTION OF DRAWINGS

The drawings described herein are for illustrative purposes only of selected embodiments and not all possible implementations, and are not intended to limit the scope of the present disclosure.

Figure 7:
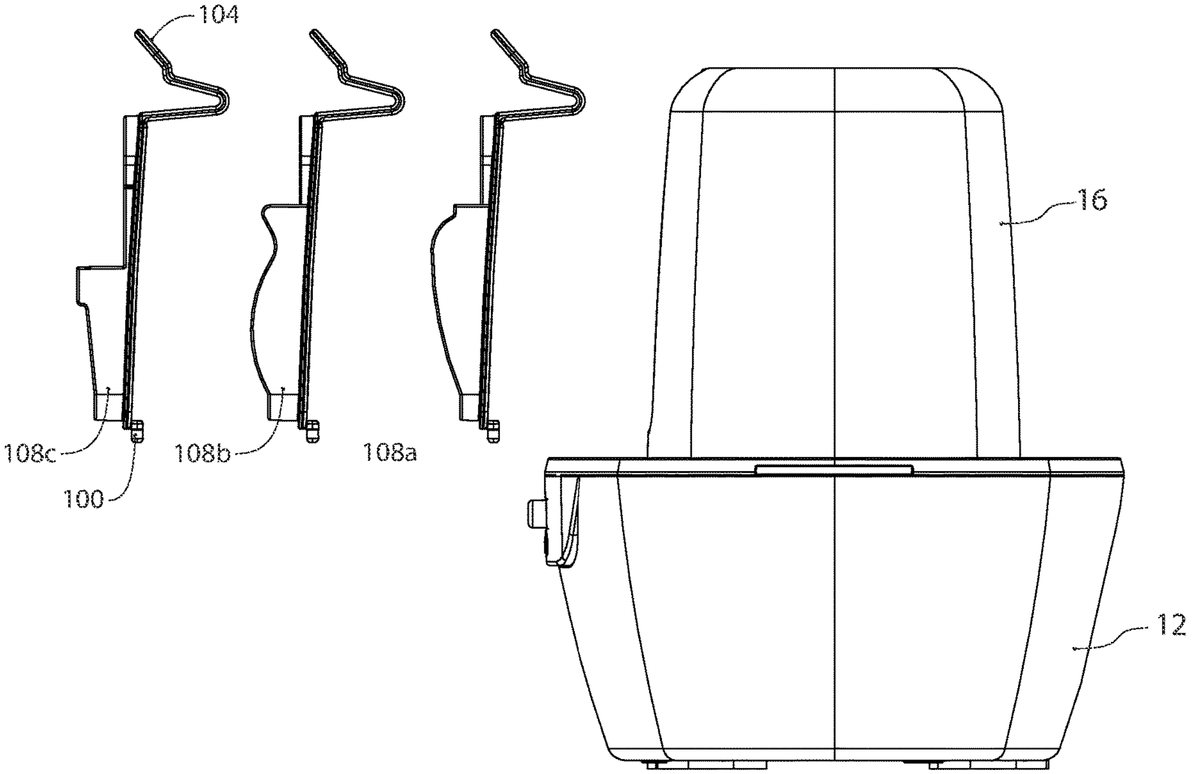
Figure 8:
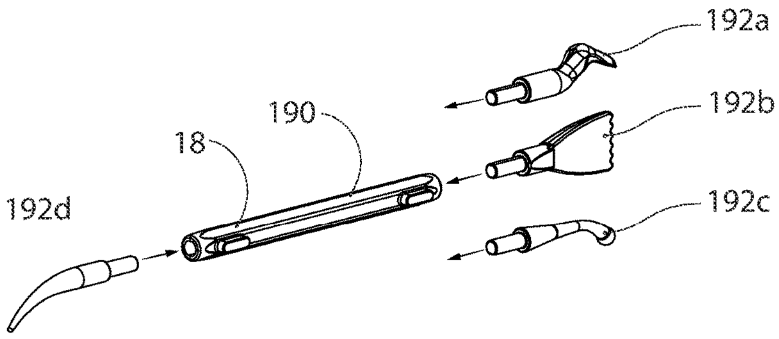

FIGS. **6*a*-6*i*** depict the clay centering tool assembly of the present invention in sequence of use;

FIG. 7 is a side view of the mini pottery wheel depicting various shaping templates; and FIG. 8 is a perspective view depicting a shaping tool with selectively interchangeable tips.

Corresponding reference numerals indicate corresponding parts throughout the several views of the drawings.

DETAILED DESCRIPTION

Example embodiments are provided so that this disclosure will be thorough and will fully convey the scope to those who are skilled in the art. Specific details are set forth such as examples of specific components, devices, and methods to provide a thorough understanding of embodiments of the present invention. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only, and is not intended to be limiting. As used herein, the singular forms "a", "an" and "the" may be intended to include the plural forms as well, unless the context clearly indicates otherwise. The terms "comprises", "comprising", "including", and "having" are inclusive, and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as a necessary order of performance. It is also to be understood that additional or alternative steps may be employed.

When an element or layer is referred to as being "on", "engaged to", "connected to", or "coupled to" another element or layer, it may be directly on, engaged, connected, or coupled to the other element or layer, or intervening elements or layers may be present. In contrast, when an element is referred to as being "directly on", "directly engaged to", "directly connected to", or "directly coupled to" another element or layer, there may be no intervening elements or layers present. Other words used to describe the relationship between elements should be interpreted in a like fashion (e.g., "between" versus "directly between", "adjacent" versus "directly adjacent", etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order, unless clearly indicated by the context. Thus, a first element, component, region, layer or section discussed below could be termed a second element, component, region, layer or section without departing from the teachings of the example embodiments.

Spatially relative terms, such as "inner", "outer", "beneath", "below", "lower", "above", "upper", and the like, may be used herein for ease of description to describe one element or feature's relationship to another element(s) or feature(s), as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
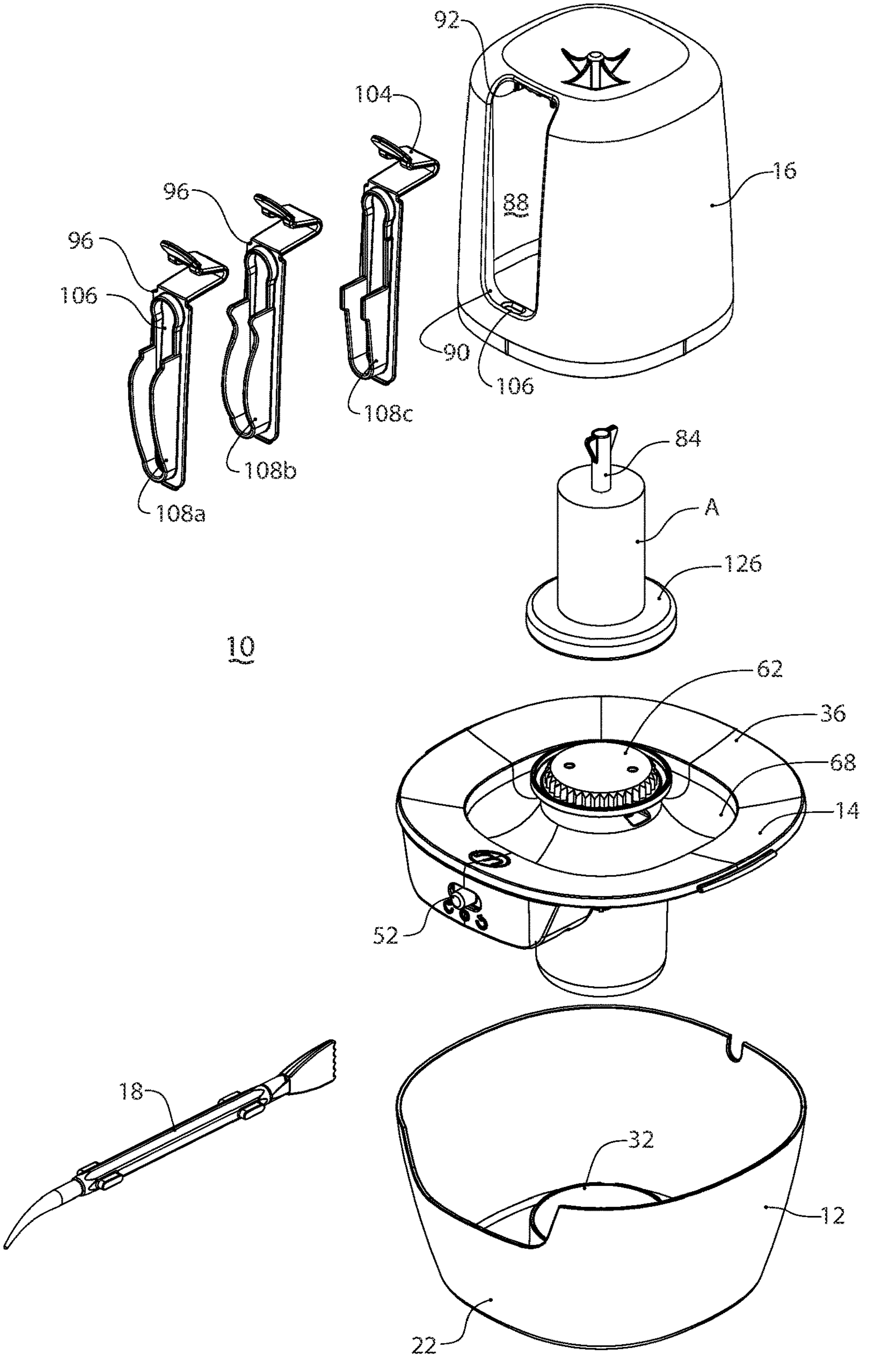
FIG. 1 is a blown apart perspective view of the mini pottery wheel in a ready to work assembly of the present invention.
Figure 2:
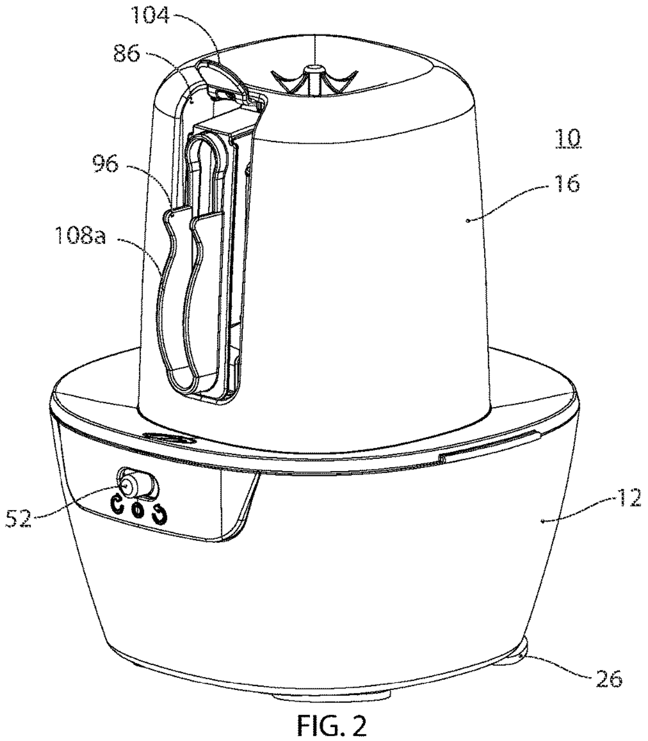
FIG. 2 is an assembled perspective view.
Figure 3:
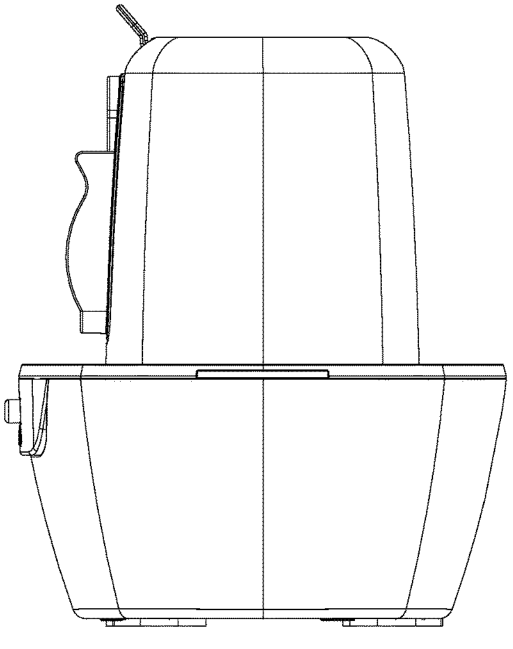
FIG. 3 is an assembled side view.

Referring to FIG. 1, there is shown in blown apart perspective view of key components of the mini pottery wheel according to the present invention in a ready for use state. By "ready for use", it is meant that only the centering tool assembly components that remain during use are depicted.

Figure 4:
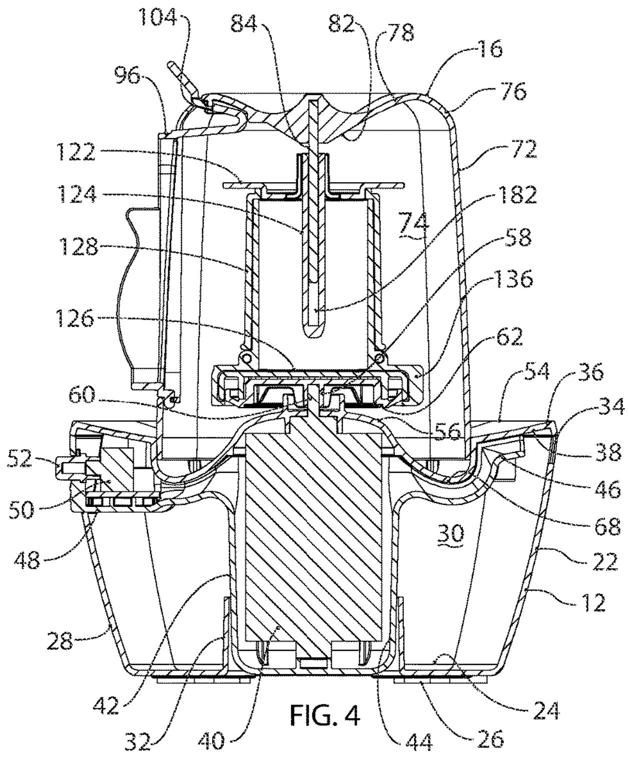
FIG. 4 is a cross-sectional view of the entire mini pottery wheel assembly.

Referring to FIG. 4, in particular, the major components employed for setting up the mini pottery wheel prior to use and according to the teaching of the present invention are shown.

The key components of the mini pottery wheel 10 for working clay or another suitable material which is designated herein as "A" include a base assembly 12, a centering tool assembly 14, an alignment structure 16, and a shaping tool 18.

The base assembly 12 generally includes a thermoplastic decorative body 22, a motor 40, and a top plate 36. The body has a floor 24, optionally including a non-slip pad or pads 26 on the underside thereof, an upwardly extending peripheral wall 28 defining an open area 30 therein which can serve as a storage space for supplies of the mini pottery wheel, such as clay, during periods of non-use. Also extending upwardly from the floor 24 is a centrally disposed open-ended tube 32. The top plate 36 seats along the upper edge 34 of the body 22. Fixedly attached to the lower side 38 of the top plate is the motor housing 42, within which is contained the motor 40 for driving the clay platform 126, e.g. wheel, as will be described in greater detail below. The lower end 44 of the motor housing 42 seats within the tube 32 of the body 22. The upper end 46 of the motor housing includes a plurality of radially extending legs 46 attached to the underside of the top plate.

Figure 5:
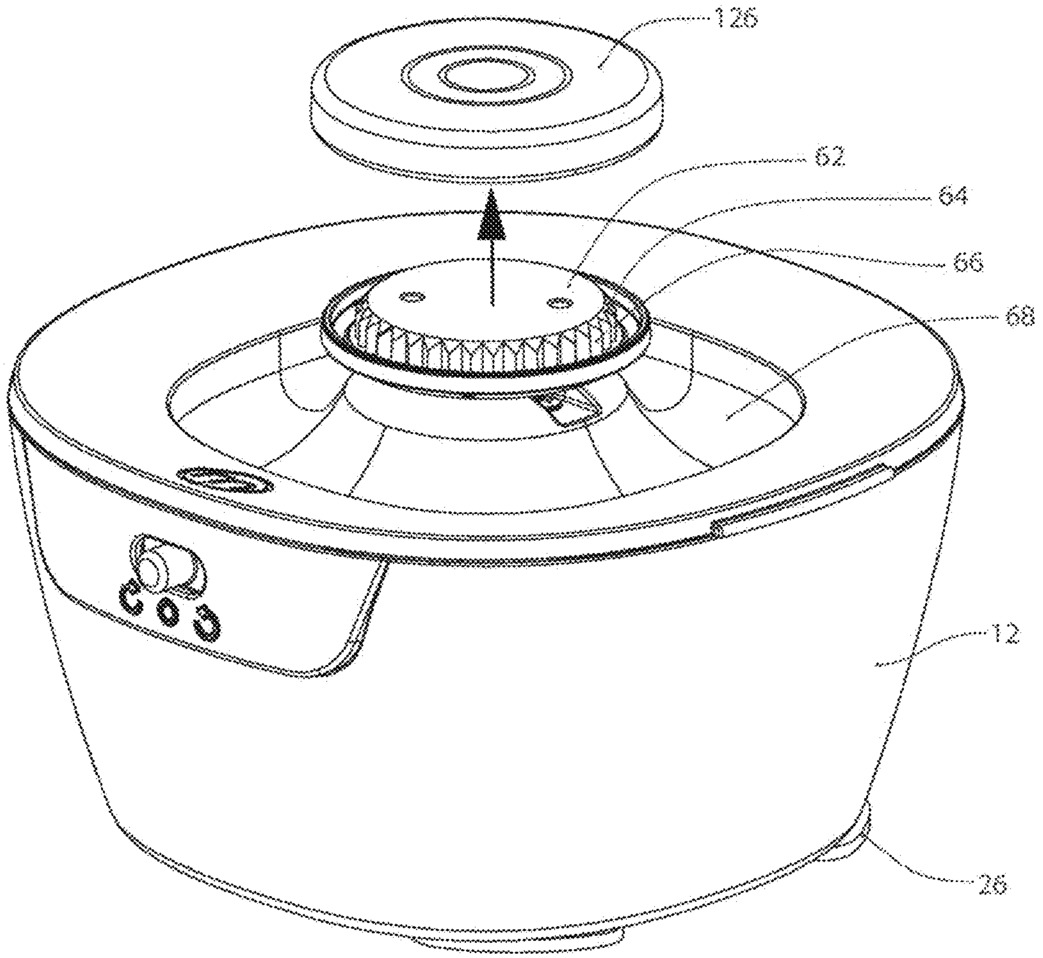
FIG. 5 is a perspective view of the base assembly.

The motor housing 42 also includes a pocket 48 which contains the electronics 50 which cooperate with the one or more switches 52 for controlling the speed and direction of the platform and clay rotation. As should be appreciated, a single switch as shown can be used to control both the direction and speed of rotation, or two separate switches could be used respectively. The upper side 54 of the top plate 36 includes a central portion 56 having an aperture 58 through which the drive shaft 60 of the motor projects. Extending from the drive shaft 60 and extending into the lower end of the working space 74 is a coupling mechanism 62 in the form of a disk having at least one of male 64 or female 66 members along the periphery for hosting the clay platform 126 in a mating relationship. The coupling mechanism 62 may be best shown in FIG. 5. Disposed radially outward of the central portion of the top plate is an annular trough 68 for receiving the cover in a manner which will be described below.

The cover 16 which is formed from substantially transparent thermoplastic material includes an outer annular wall 72 defining an open area 74 which serves as the working space for shaping the clay to a desired end product. Integrally and inwardly extending along the top of the outer wall 72 is the roof 78. Extending into the open area 74 from the lower side 82 of the roof 78 is a pin 84 which mates with a post member 124 associated with the centering assembly. Disposed along a portion of the outer wall 72 may be an inset 86 defining an elongated slot 88 for receiving a shaping template 96. During use of the mini pottery wheel, the lower end 94 of the cover is set within the trough such that it seats against a trough wall to preclude lateral movement. The slot includes a lower end 90 and an upper end 92. The shaping template includes a tab 100 disposed along the lower end 98 thereof and a flexible clip 104 extending from the upper end 102 thereof. To attach the shaping template to the cover, the tab 100 is first inserted into a hole 106 provided along the lower end of the slot. Thereafter, the flexible clip 104 is pressed into the upper end of the slot until the clip couples to the housing in the press fit relationship. To remove and replace the shaping template, the flexible clip is depressed until the clip is decoupled at the upper end and the template is pulled away from the slot. As shown in FIG. 8, different templates 96 having varied guide shape patterns, **108*a*, 108*b* and 108*c* by way of non-limiting example, extend outwardly from the template to define an opening 106** for receiving a shaping tool, are contemplated to carry out different shaping techniques upon the clay.

Referring to FIGS. **6*a*-6*i*, the centering tool assembly 14** is shown in series to best demonstrate both the structure and sequence of utilizing the components thereof to prepare the clay for shaping. As should be understood, a variety of clays can be used under the present invention. For example, semi-natural clays having a kaolin content of greater than 40% by total composition, and a total moisture content (including water) of less than 25%, have proven effective and commercially available clays such as Sio-2, DAS Terracotta, Sculpey Air-Dry, may be employed.

The components of the centering tool assembly 14 include a packing shell 120, an end cap 122, a post member 124, and a clay platform 126. Optionally, the assembly also includes a support sleeve 128 and a removable plastic sheet 130 that helps ensure that the clay does not stick to the inside of the packing shell as clay is packed. As should be appreciated in order to obtain a quality end product, it is important to ensure a quality loading and packing of the clay to be worked.

Figure 6A:
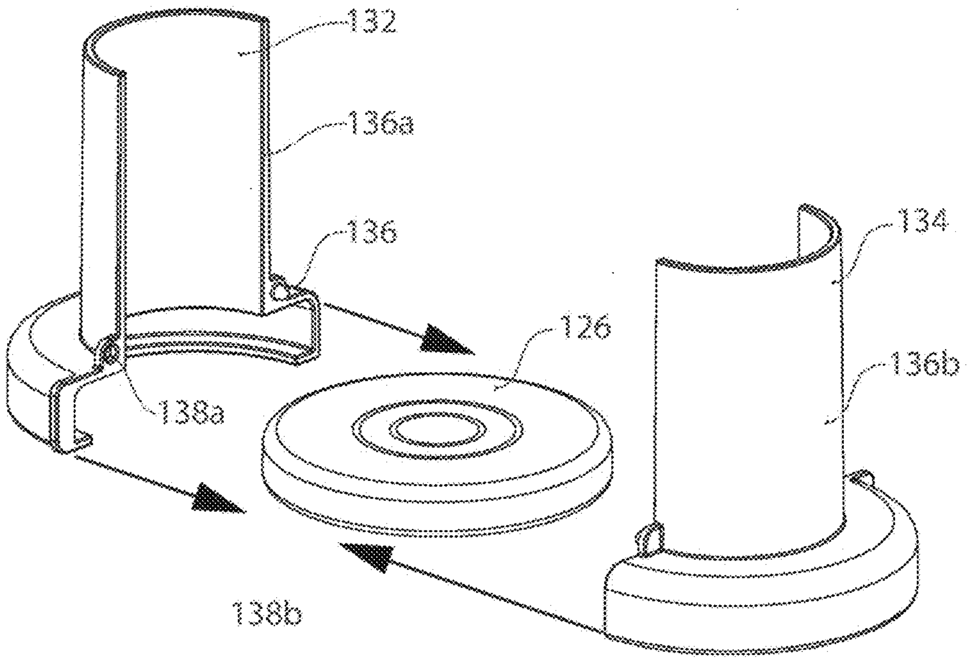
Figure 6B:
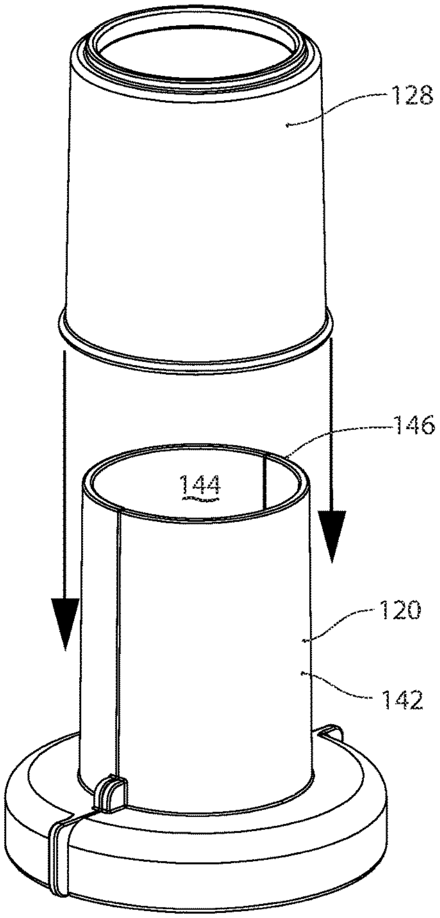
Figure 6C:
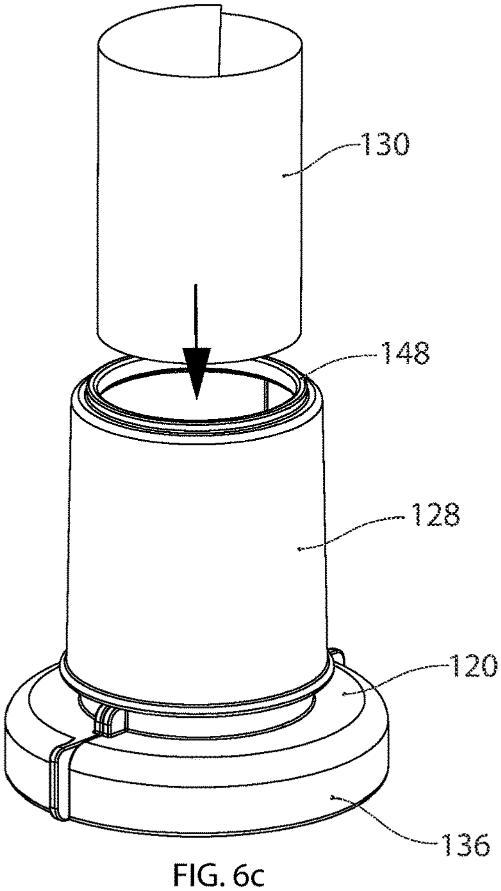
Figure 6D:
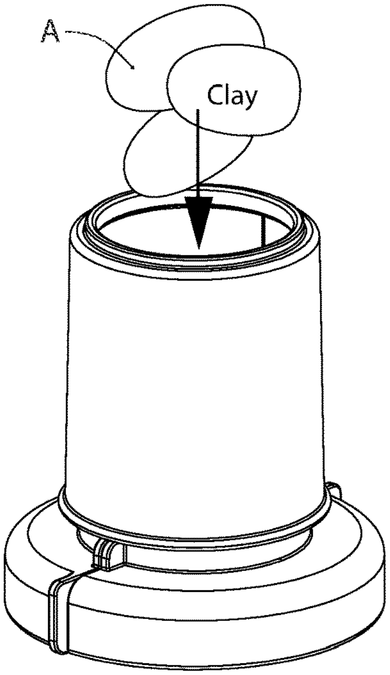
Figure 6E:
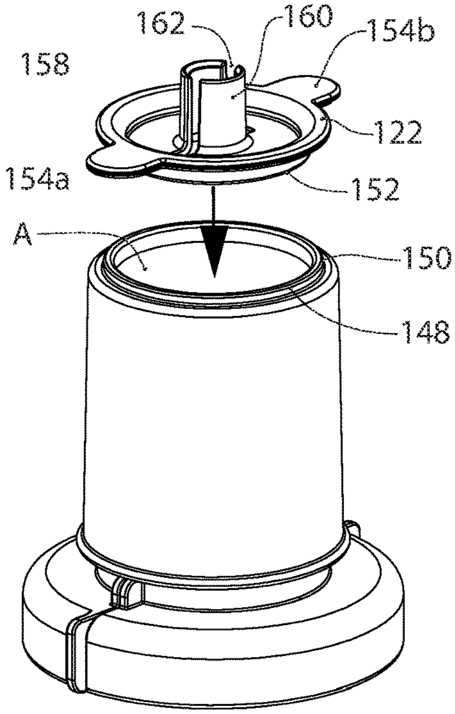

Initially, the first 132 and second 134 halves of the shell 120 are clamped together to capture the clay platform 126 as shown in FIG. **6*a*. Each of the shell halves include receptacle portions 136***a* and 136*b* forming a receptacle 136 which overfits the periphery of the clay platform, leaving a majority of the platform face 140 free to host the clay. The receptacle 136 which is shown to have a clam-shell configuration also preferably includes press fit male and female members 138*a* and 138*b* to ensure the platform is fully captured as the two halves are brought together. Extending upwardly from the receptacle upon joining the two halves is a clay repository 142 defining an open area 144 for receiving the clay as shown in FIG. 6*b*. As illustrated, the receptacle typically has a substantial cylindrical shape. To ensure that the two halves 136*a* and 136*b* of the packing shell 120 remain locked together over the platform, it may be beneficial to use a sleeve 128 which can be disposed over the shell as shown in FIG. 6*b*. Likewise, optionally but preferably, a non-stick thermoplastic sheet 130 can be installed into the open area of the shell to line the inside thereof as shown in FIG. 6*c*. Once the shell is set up to this stage, clay can then be packed into the open area 144 as shown in FIG. 6*d* until the clay reaches the top 146 of the shell as shown in FIG. 6*e*. While it will generally be easy to tell when the clay has been fully packed, it may be desirable to form the shell 120, as well as the sleeve 128 and thermoplastic sheet 130, if employed, from transparent materials so as to allow for full visual inspection of the packed clay.

Figure 6F:
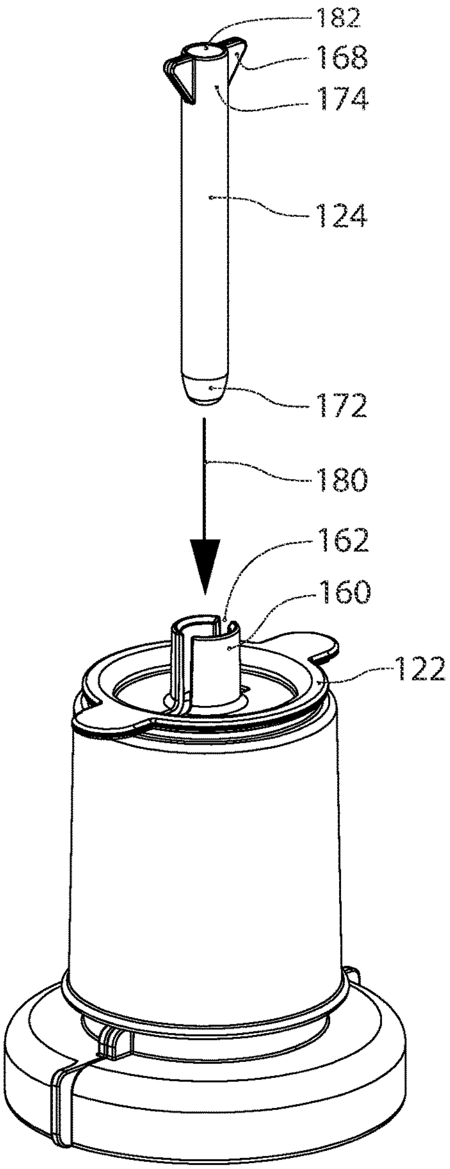
Figure 6G:
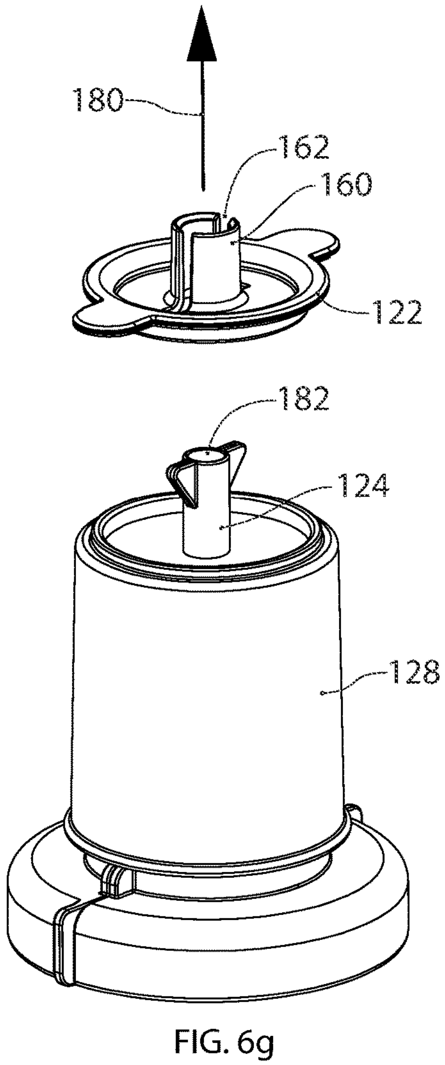
Figure 6H:
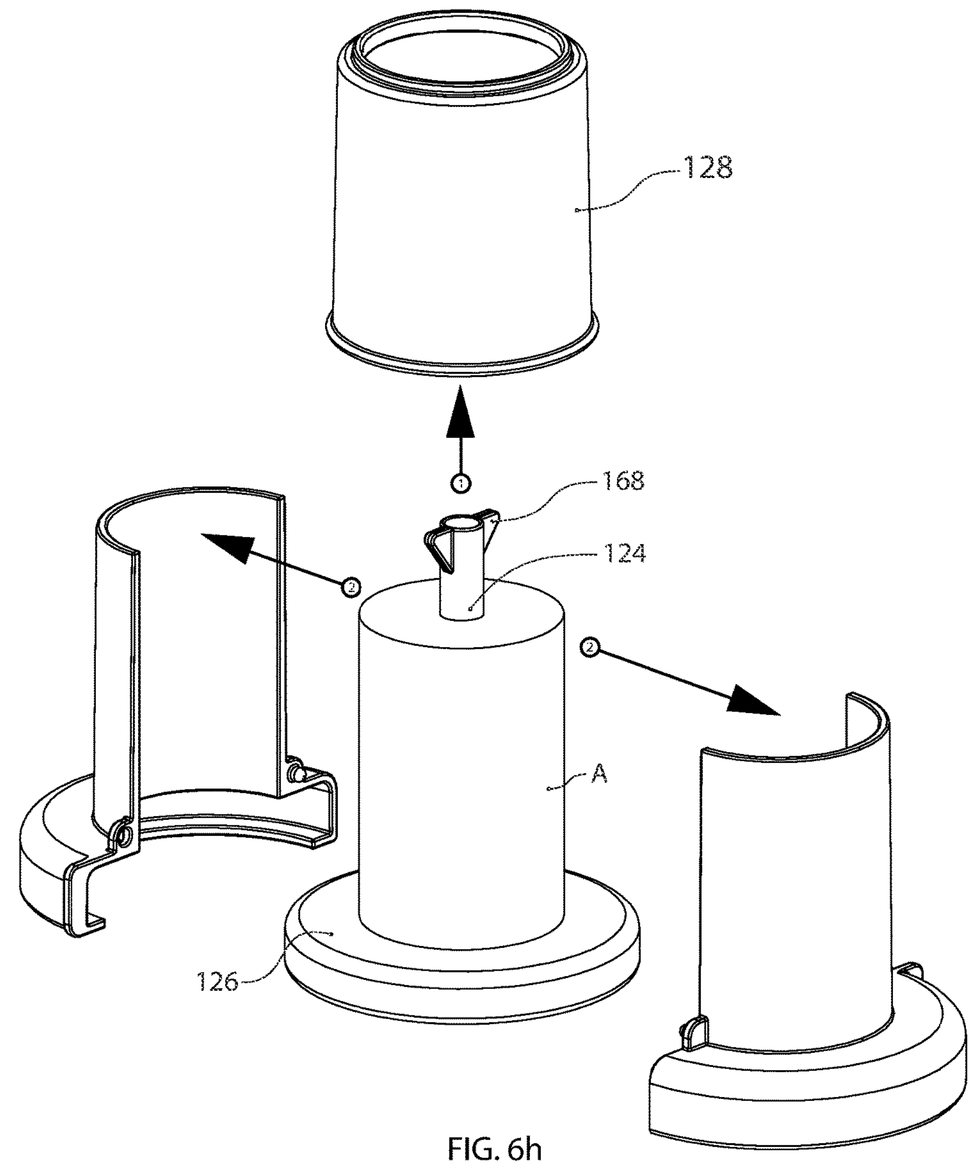
Figure 6I:
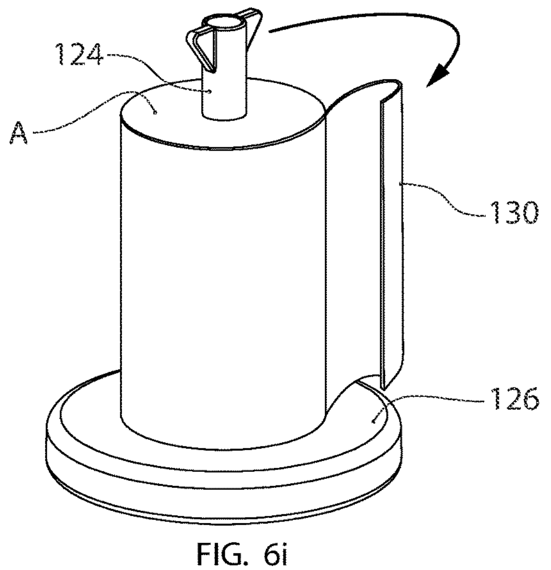

Referring to FIG. 6*e*, once the clay is fully packed, an end cap 122 is fit over the top of the shell 120 and sleeve 128 such that a downwardly projecting annular portion 152 of the end cap seats within the ring 148 along the top 150 of the sleeve. The end cap may include mutually opposing fingers 154*a* and 154*b*, which assist in the placement and removal of the end cap once the post member 124 is disposed within the clay. To assist in affixing the post member, the end cap is provided with an upwardly extending socket 160 projecting from the top wall 158 thereof. The socket may include one or more slots 162 for receiving one or more alignment tabs 168 projecting outwardly from the trailing end 174 of the post member 124. As shown in FIG. 6*f*, the leading end 172 of the post is inserted through the socket 160 and into the packed clay contained within the shell. The post is inserted until the alignment tabs extend into the slots 162. By inserting the post member in this manner, it will ensure that the post remains fixed about the central axis 180 of the packed clay during use. Once the post member is properly set, the end cap 126 is removed as shown in FIG. 6*g*, followed by removal of the sleeve 128 and the shell 120 as shown in FIG. 6*h*. Lastly, the thermoplastic sheet 130 is removed as demonstrated in FIG. 6*i*. Thus, all that remains after packing the clay is the post member projecting upwardly from the clay along a central axis 180.

With the clay ready to be worked, the platform 126 is placed over the coupling mechanism 62 in a generally nesting relationship as noted above, such that the platform and the clay with the post member embedded therein can be rotated. Prior to the rotation however, the cover 16 is positioned over the base assembly. The cover 16 is aligned such that the pin 84 penetrates the central bore 182 of the post member as the cover is disposed upon the top plate of the base assembly as described above. The pin extends sufficiently into the central bore to ensure that the clay remains centrally disposed upon the platform while being worked.

Finally, with the cover in place, a shaping template is attached to the cover as described above. As should be understood once the cover is securely attached to the base, templates can be interchanged as desired without the need to remove the cover. In this way, the multiple templates can be utilized to carry out different stages of the clay shaping in a convenient manner.

To work the clay once the user has decided upon an end product design, the motor is turned on to rotate the clay in a desired direction and at a predetermined speed. The platform can turn clockwise or counter-clockwise to accommodate right-handed users or left-handed users. For example, right-handed carving (clay shaping) can be carried out with the platform and clay rotating in a counter-clockwise direction. Thereafter, once carving is completed, the direction can be changed to carry out a decoration function, such as painting the end product. The opposite direction (clockwise) can be used for left-handed users. Still, it should be understood that rotations and speeds can be a matter of user preference, and single direction rotation and/or speeds are contemplated. Thereafter, a shaping tool 18 is inserted through the template opening 106. The shaping tool 18 as shown in FIG. 8 preferably includes a handle 190 and one of various selectively interchangeable tips 192*a*, 192*b*, 192*c* and 192*d*, for example. Without limitation, tip 192*a* is suited for carving and removing material from the clay, tip 192*b* is suited for adding series of grooves, tip 192*c* is suited for hollowing clay to some extent, and tip 192*d* is suited for adding fine details, for example. Still, other uses and other tip designs are contemplated.

The top speed of the wheel pre-loaded with clay is approximately 1000 rpm. As the clay is being shaped, e.g., selectively carved, the user places the desired tip slowly and with limited pressure into contact with the clay to begin shaping. The tool may be advanced along the template to help control the shaping process. While predetermined end product designs can be obtained utilizing the various shaping tools following a work pattern employing one or more templates in sequence, it should be understood that free-formed designs are also possible. The user will develop tactile skills through use of the device, and will intuitively gain expertise in developing quality end products in a relatively short amount of time. Once the raw end product is achieved, the cover may be removed and the end product can be decorated. If the end product is decorated on the wheel, the motor can be switched to a slower rotation setting and the object can be easily painted. Still, other aspects of the present invention will become apparent through use of the below claimed invention.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mini pottery wheel comprising:

a base assembly including a motor for turning a platform having clay disposed thereon;

a post member partially embedded within the clay; and a support structure including an at least partially transparent cover including a roof and an annular wall extending therefrom selectively attachable to said base assembly, said cover defining an open area for working said clay and a downwardly extending pin extending from the cover, said pin engaging the post member, said pin and said post member defining an axis of rotation of the clay upon the platform; and wherein said cover includes at least one slot disposed along the annular wall through which a portion of a hand-held shaping tool is inserted to contact and shape said clay.

2. The mini pottery wheel of claim 1, wherein said post member includes a central bore for receiving said pin.

3. The mini pottery wheel of claim 1, wherein at least one shaping template is coupled to said cover along a slot.

4. The mini pottery wheel of claim 3, wherein said shaping tool includes a handle and one or more selectively interchangeable tips.

5. The mini pottery wheel of claim 1, further comprising a centering tool assembly for positioning the post member along a central axis within the clay.

6. The mini pottery wheel of claim 5, wherein the centering tool assembly includes a removable shell into which the clay is packed and a cap attachable to the shell including a socket through which the post member is inserted into the clay.

7. The mini pottery wheel of claim 6, wherein the shell includes first and second adjoining pieces defining a receptacle which captures the platform along the periphery and a clay repository for packing the clay upon the platform.

8. The mini pottery wheel of claim 7, wherein the centering tool assembly further comprises a sleeve disposed over the assembled shell to assist in maintaining the shell as a single piece during clay packing.

9. The mini pottery wheel of claim 1, wherein said motor is a multi-speed motor.

10. The mini pottery wheel of claim 1, wherein the motor is capable of rotating the platform and clay in either a clockwise or counterclockwise direction.

11. A mini pottery wheel comprising:

a base assembly including a body and a motor disposed within the body for turning a rotatable platform having clay disposed thereon;

a centering tool including a selectively removable clay packing shell, a post member insertable into the clay including an elongated bore and a cap for aligning the post member for insertion into the clay; and an at least partially transparent cover selectively attachable to the base assembly, said cover including a roof having a downwardly extending pin which is inserted within the elongated bore of the post member to assist in maintaining the clay upon the rotatable platform during use and an annular wall extending from the roof, said annular wall including at least one elongated slot through which a portion of a hand-held shaping tool is inserted to contact and shape said clay.

12. The mini pottery wheel of claim 11, wherein the base assembly body includes a floor, an upwardly extending peripheral wall, and a tube extending upwardly from the floor for receiving said motor.

13. The mini pottery wheel of claim 11, wherein the base assembly includes a top plate attached over the body, said top plate including an upper side having a centrally disposed aperture for receiving a motor drive shaft, and an annular trough for hosting a portion of said cover.

14. The mini pottery wheel of claim 13, wherein a coupling member is attached to said drive shaft, said coupling member receiving said rotatable platform in a mating relationship.

15. The mini pottery wheel of claim 13, wherein the top plate includes an underside which hosts a motor housing containing the motor and electronics for controlling the motor.

16. The mini pottery wheel of claim 11, wherein said cap includes a socket for receiving the post member insertable into the clay.

17. The mini pottery wheel of claim 16, wherein the shell includes first and second adjoining pieces defining a receptacle which captures the periphery of the platform, and a clay repository for packing the clay upon the platform.

18. The mini pottery wheel of claim 17, wherein the centering tool assembly further comprises a sleeve disposed over the shell to assist in maintaining the shell as a single piece during clay packing.

19. The mini pottery wheel of claim 11, wherein said shaping tool includes a handle and one or more selectively interchangeable tips.

20. The mini pottery wheel of claim 11, wherein said motor is a multi-speed motor capable of rotating the platform and clay in either a clockwise or counterclockwise direction.

* * * * *